Jan. 17, 1950     J. M. VAN DER POEL     2,494,915
METHOD OF GAS-FILLING AND SEALING VESSELS
Filed April 24, 1946
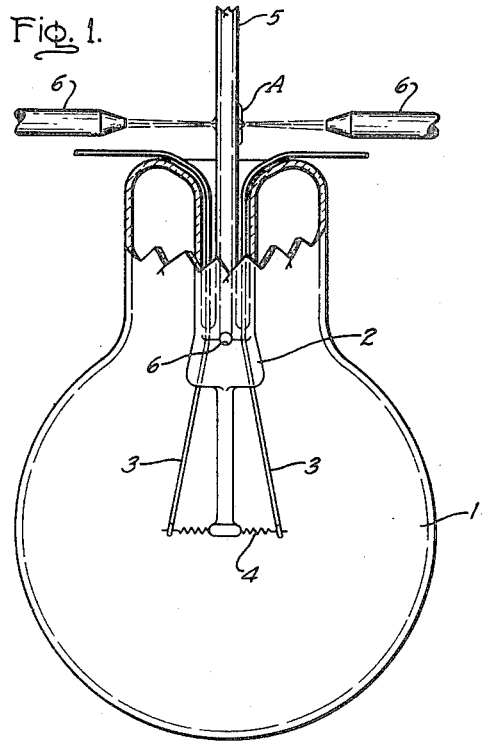
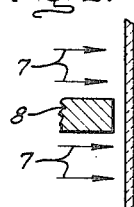
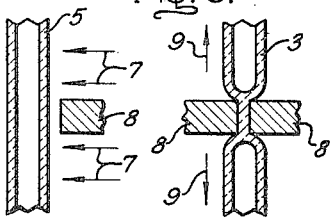
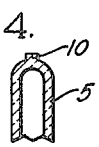
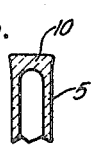
Inventor:
Johannes Marinus Van Der Poel,
by John J Anderson,
His Attorney.

Patented Jan. 17, 1950

2,494,915

UNITED STATES PATENT OFFICE 2,494,915

METHOD OF GAS-FILLING AND SEALING VESSELS

Johannes Marinus van der Poel, Eindhoven, Netherlands, assignor to General Electric Company, a corporation of New York Application April 24, 1946, Serial No. 664,464
In the Netherlands April 16, 1942

6 Claims. (Cl. 316—19)

My invention relates to a method for hermetically closing or sealing off vessels such as bulbs or envelopes for electric lamps and the like, and more particularly to a method for tipping off the vitreous exhaust tube of a vessel containing gas under pressure greater than atmospheric.

Sealing off the exhaust tube of a gas-filled vessel in which the pressure of the gas is less than the ambient pressure during the sealing off operation does not entail difficulties in practice. In sealing off the exhaust tube of such a vessel (for instance an electric incandescent lamp or a discharge tube) in which the gas pressure amounts, for instance, to 60 centimeters of mercury column and the sealing off operation takes place in the presence of an ambient pressure of one atmosphere, the part of the exhaust tube to be sealed, which is heated to the softening point, collapses under the action of the excess pressure prevailing at the outside of the exhaust tube and can be pinched without any difficulty, thus insuring a perfectly gas-tight seal of the exhaust tube.

A different condition is present, however, when the pressure of the gas filling within the vessel, and therefore within the exhaust tube, exceeds the ambient pressure during the sealing off operation. This is the case, for instance, in sealing incandescent lamps filled with a gas having a pressure exceeding one atmosphere when the sealing operation is carried out in an ambient pressure of one atmosphere. On heating the portion of the exhaust tube to be sealed off, the softened tube portion tends to bulge or deform outwardly under the influence of the higher internal gas pressure therein, as a result of which it is extremely difficult to obtain a suitable gas-tight seal of the exhaust tube without special means. In a well known method of overcoming this difficulty, the vessel to be filled is dipped in a liquid gas during the gas-filling operation, as a result of which the filling gas, on entering the vessel through the exhaust tube, condenses so that during the subsequent sealing off operation of the exhaust tube, during which operation the vessel to be filled is kept submerged in the liquid gas, no excess pressure is present in the vessel to interfere with the sealing off of the tube. In another well known method wherein the filling gas, during the sealing off operation of the exhaust tube, is under an excess pressure with respect to that of the ambient, the bulging of the exhaust tube is avoided by surrounding the softened part of the exhaust tube with a thin-walled metal former. These known methods, however, have the disadvantage that they do not lend themselves to mass production.

It is an object of the present invention, therefore, to provide a novel method of sealing off a vessel filled with gas at a pressure above atmospheric, which method is simple and effective in character and which readily lends itself to mass production.

Another object of the invention is to provide a novel method of tipping off the glass exhaust tube of a vessel filled with gas to a pressure above atmospheric.

Further objects and advantages of my invention will appear from the following description of a species thereof and from the accompanying drawings in which:

Fig. 1 is an elevation, partly in section, of an electric incandescent lamp and illustrating the first step of the method comprising my invention; Figs. 2 and 3 are fragmentary sectional views illustrating subsequent steps in the method comprising my invention; and Figs. 4 and 5 are fragmentary sectional views, taken at right angles to one another, of the finished exhaust tube tip.

The method according to the invention is characterized by the fact that after the vessel has been filled with gas to a pressure such that the pressure within the vessel corresponds at least approximately to the pressure of the ambient, the exhaust tube is so heated that at least a section of the inner side thereof possesses at least locally adhesive properties. Thereafter, the vessel is filled with gas having the desired pressure above that of the ambient, during which operation the outer wall of the exhaust tube is maintained at a temperature such that the outer wall is not liable to material deformations under the action of the internal gas pressure. The exhaust tube is then closed, the sealing of the vessel being brought about by the adherence between the surface parts of the inner wall of the exhaust tube which surface parts still have a high temperature. One illustrative example of the method according to the invention is shown in the drawing.

The gas filling and sealing-off process according to the invention comprises four more or less separate steps or phases as follows:

(1) The vessel is first filled with gas to a pressure approximately equal to that of the surrounding atmosphere. In this way, it is possible to proceed with the second step of the process without the liability of the exhaust tube bulging outwardly or collapsing.

(2) In this step, the exhaust tube is heated in such a manner that at least a section of its inner wall possesses adhesive properties. To such end, the inner wall of the exhaust tube will generally have to be heated to a temperature exceeding the softening point of the material from which the exhaust tube is made. This heating operation may, for instance, be effected in the manner illustrated in Fig. 1 of the drawing. In this case, the vessel to be filled with gas and to be sealed off is in the form of an electric incandescent lamp which is to be filled with gas to a pressure of 100 cms. mercury column. The incandescent lamp comprises a glass bulb 1 provided with a re-entrant stem 2 having lead-in wires 3, 3 sealed therethrough and supporting a filament 4 within the bulb. The stem 2 is provided with an outwardly extending exhaust tube 5 which communicates with the interior of the bulb through an opening 6 in the stem tube. In accordance with the first step of the method comprising the invention, the bulb 1, which is located in an ambient of atmospheric pressure, is filled through the exhaust tube 5 with gas to a pressure of about 76 cms. mercury column, i. e., approximately atmospheric pressure. Thereafter, the burners 6 shown in Fig. 1 are directed against the exhaust tube 5 in such a manner as to heat the tube at its inner surface to a temperature which exceeds the softening point of the material from which the exhaust tube is made and which will impart adhesive properties thereto. In the illustrated manner of heating the exhaust tube 5, the outer side of the tube will also be heated to a very high temperature, since the transfer of heat must take place from the outer side of the tube to the inner side therof. If, without taking any special steps, more gas were admitted into the bulb 1 through the exhaust tube 5, the latter would immediately bulge out over the region A where it is very highly heated, due to which it would be practically impossible to close the exhaust tube in a gas-tight manner. This is why, in the example according to the invention, the outer wall of the exhaust tube is subsequently cooled.

(3) In this step, which is illustrated in Fig. 2, the burners 6 shown in Fig. 1 are removed and the outer wall of the exhaust tube 5 is cooled superficially by suitable artificial means, such as by directing a stream of cooling air thereagainst as indicated by the arrows 7, as a result of which it is brought to such a lower temperature as to prevent the oute wall from being materially deformed during the filling of the lamp with gas to the eventual pressure (in the present case to approximately 100 cms. mercury column), which gas filling operation takes place during or after the said artificial cooling of the exhaust tube. During this treatment, the inner wall of the exhaust tube conserves a sufficient temperature to permit an air-tight sealing of the exhaust tube in the next step. Consequently, a fairly large temperature difference then exists between the inner and outer wall of the exhaust tube.

(4) In this step, illustrated in Fig. 3, the jaws 8 of tongs, which are opened in Fig. 2, are closed against the exhaust tube 5 to pinch it off. The persisting high temperature of the inner side of the exhaust tube and the adherence between the pinched surface parts of the inner wall of the exhaust tube permits the formation of a perfectly gastight seal of the exhaust tube. The jaw parts 8 of the tongs which are used to close the exhaust tube preferably consist of a material having a low thermal conductivity, such as chrome iron, as a result of which the dissipation of heat by these jaw parts 8 is relatively low and the adherence of the surface parts of the inner wall of the exhaust tube is insured. Preferably, the arms of the tongs carrying these jaw parts 8 also have a very small cross-section in order that the transfer of heat may be reduced as much as possible. When making use of the method according to the invention, the exhaust tube 5 may, if desired, be slightly drawn out in a longitudinal direction before or during the pinching operation, such as is shown diagrammatically by the arrows 9 in Fig. 3. In this way, tensile stresses are imparted to the glass by which the liability of bulging, if the outer wall of the exhaust tube were at a temperature slightly above that at which material deformation would occur, is further largely reduced. After the sealing operation, the top of the exhaust tube is broken or cut off at the seal, and the finished seal then appears as shown at 10 in Figs. 4 and 5.

Particularly when the exhaust tube forming part of the vessel to be filled with gas and to be sealed off is of relatively large size or diameter, the inner wall of the exhaust tube, instead of being heated by conduction from the outer wall thereof, may be heated by means of a heating member located within the exhaust tube. This member may take the form, for instance, of an electric resistance heating element or of an element capable of being heated by high frequency induction. After the inner side of the tube has attained a sufficient temperature, the heating element will generally have to be removed unless, for instance in the case of high frequency heating, it consists of a metal rod whose surface perfectly adheres to the glass of the exhaust tube when closing the latter. With this internal heating method, of course, sufficient space must remain in the exhaust tube at the side of the heating element therein in order to permit passage of the filling gas.

By giving the heating element suitable proportions, the cooling of the outer wall of the exhaust tube may be omitted in some cases.

In the particular case described hereinabove it has been assumed that the incandescent lamp is to be sealed off in an ambient having a pressure of one atmosphere, the pressure in the lamp exceeding one atmosphere. However, it will be appreciated that, although this will usually be the case, the method according to the invention may generally be used in any case where the gas pressure within the vessel exceeds that of the ambient.

What I claim as new and desire to secure by Letters Patent of the United States is:

1. The method of gas filling and sealing a vessel provided with a depending vitreous tube which includes the steps of filling the vessel with gas to a pressure corresponding approximately to the pressure of the ambient atmosphere, heating and establishing in a portion of the said tube a temperature differential between its inner and outer walls such that the inner wall is sufficiently plastic for sealing whereas the outer wall is sufficiently rigid to withstand material deformation by internal gas pressure substantially exceeding that of the said ambient atmosphere, and then filling the vessel with gas to a pressure substantantially exceeding that of the ambient and pinching the said tube portion to seal it off.

2. The method of gas filling and sealing a vessel provided with a depending vitreous tube which includes the steps of filling the vessel with gas to a pressure corresponding approximately to the pressure of the ambient atmosphere, heating and establishing in a portion of the said tube a temperature differential between its inner and outer walls such that the inner wall is sufficiently plastic for sealing whereas the outer wall is sufficiently rigid to withstand material deformation by internal gas pressure substantially exceeding that of the said ambient atmosphere, filling the vessel with gas to a pressure substantially exceeding that of the ambient, drawing out the tube a slight amount in a longitudinal direction, and pinching the said portion of the tube to seal it off.

3. The method of gas filling and sealing a vessel provided with a depending vitreous tube which includes the steps of filling the vessel with gas to a pressure corresponding approximately to the pressure of the ambient atmosphere, externally heating a portion of the said tube to a degree such that the inner wall of the said tube portion is at least sufficiently plastic for sealing, artificially cooling the outer wall of the said tube portion, while leaving the inner wall thereof in its said plastic condition, until said outer wall portion is sufficiently rigid to withstand material deformation by internal gas pressure substantially exceeding that of the said ambient atmosphere, and then filling the vessel with gas to a pressure substantially exceeding that of the ambient and pinching the said tube portion to seal it off.

4. The method of gas filling and sealing a vessel provided with a depending vitreous tube which includes the steps of filling the vessel with gas to a pressure corresponding approximately to the pressure of the ambient atmosphere, internally heating a portion of the said tube to render the inner wall thereof sufficiently plastic for sealing while leaving the outer wall thereof sufficiently rigid to withstand material deformation by internal gas pressure substantially exceeding that of the ambient, and then filling the vessel with gas to a pressure substantially exceeding that of the ambient and pinching the said tube portion to seal it off.

5. The method of gas filling and sealing a vessel provided with a depending vitreous tube which includes the steps of filling the vessel with gas to a pressure corresponding approximately to the pressure of the ambient atmosphere, introducing a heating element into the tube, energizing the said element to cause it to heat a portion of the inner wall of the tube to a plastic condition while leaving the outer wall thereof sufficiently rigid to withstand material deformation by internal gas pressure substantially exceeding that of the said ambient atmosphere, and then filling the vessel with gas to a pressure substantially exceeding that of the ambient and pinching the said tube portion to seal it off.

6. The method of gas filling and sealing a vessel provided with a depending vitreous tube which includes the steps of filling the vessel with gas to a pressure corresponding approximately to the pressure of the ambient atmosphere, externally heating a portion of the tube to a degree such that the inner wall of the said tube portion is at least sufficiently plastic for sealing, directing a current of cooling air against the heated outer wall of the said tube portion to rapidly cool the outer wall, while leaving the heated inner wall in its said plastic condition, until said heated outer wall portion is at a temperature appreciably lower than that of the heated inner wall portion and is sufficiently rigid to withstand material deformation by internal gas pressure substantially exceeding that of the said ambient atmosphere, and then filling the vessel with gas to a pressure substantially exceeding that of the ambient and pinching the said tube portion to seal it off.

JOHANNES MARINUS van der POEL.

REFERENCES CITED

The following references are of record in the file of this patent:

UNITED STATES PATENTS

| Number | Name | Date |
| --- | --- | --- |
| 2,014,471 | De Neumann | Sept. 17, 1935 |

FOREIGN PATENTS

| Number | Country | Date |
| --- | --- | --- |
| 428,802 | Great Britain | May 20, 1935 |